Oct. 13, 1970     H. D. POULSON     3,533,194
THREAD GRINDER

Filed May 29, 1967

INVENTOR.
HOMER DAVID POULSON
BY
Charles L. Lauerhub
attorney

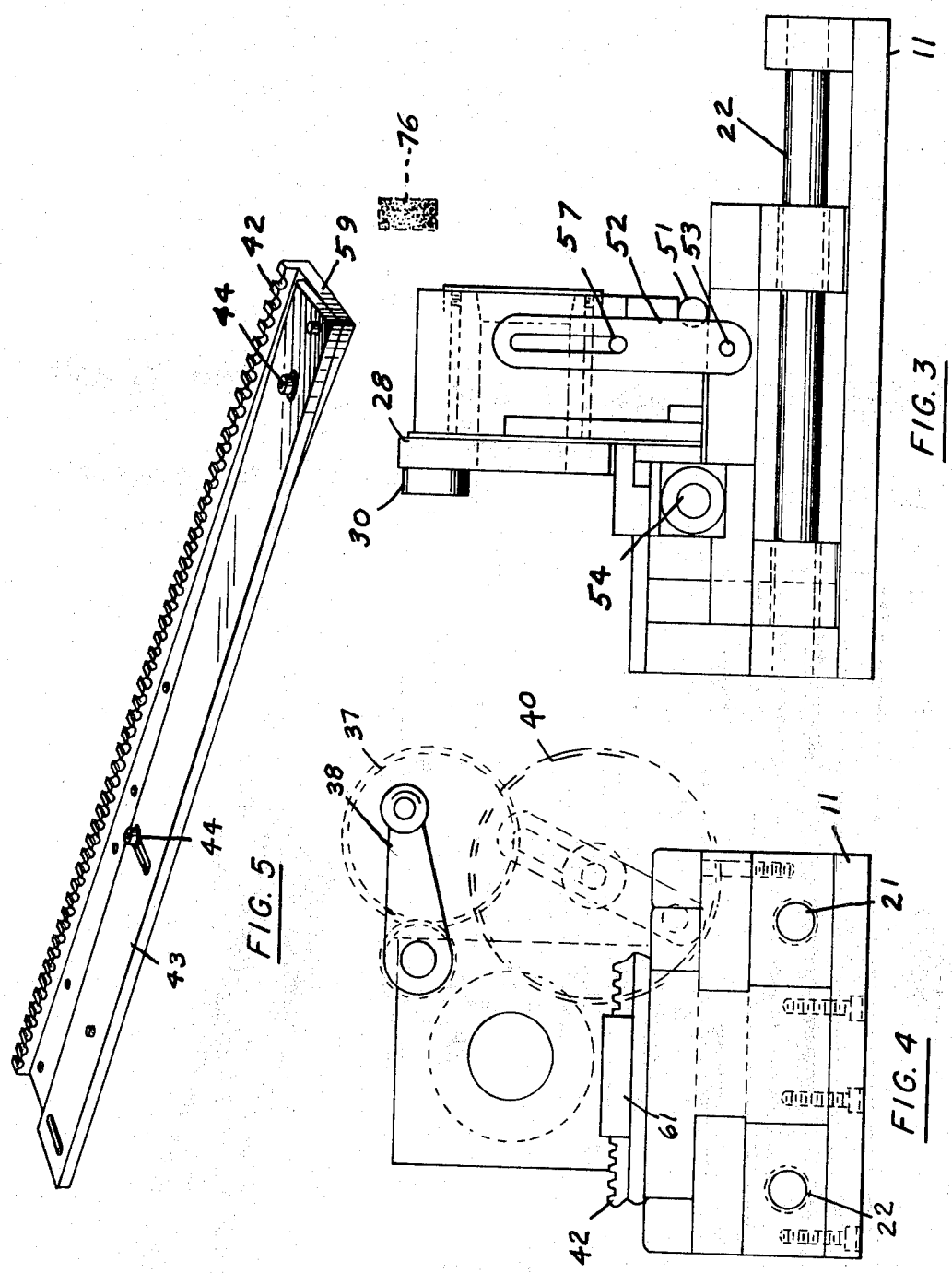

3,533,194
THREAD GRINDER
Homer David Poulson, 2729 Athens St.,
Erie, Pa. 16510
Filed May 29, 1967, Ser. No. 642,092
Int. Cl. B24b 47/02, 3/00
U.S. Cl. 51—232
2 Claims

ABSTRACT OF THE DISCLOSURE

In the invention herein disclosed, a spindle is provided rotatably supported on a headstock for supporting the rod to be ground. The headstock is slidably supported on ways to slide in the direction of axis of rotation of the spindle. A cam is supported on the headstock and slides transversely under the axis of rotation of the spindle and the cam and headstock are urged against a follower by springs connected to the headstock. A gear arrangement is provided to drive the spindle in rotation and to move the cam transversely of the axis of rotation of the spindle in synchronism with each other. The headstock is supported on the base by means of a sine bar, thus the vertical angle of the axis of rotation of the spindle relative to the path through which the headstock slides can be adjusted.

---

This invention relates to fixtures and, more particularly, to the type of fixtures used on machine tables for cutting threads on rods and the like.

Previous fixtures of this type were more complicated and could not be used as universally as the fixture disclosed herein.

It is accordingly an object of the invention to provide an improved fixture suitable for thread grinding.

Another object is to provide a fixture suitable for thread grinding which is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawings:

FIG. 3 is a side view of the machine.

FIG. 4 is a rear end view partly in phantom of the machine.

FIG. 5 is an enlarged view of the cam.

Figure 1:
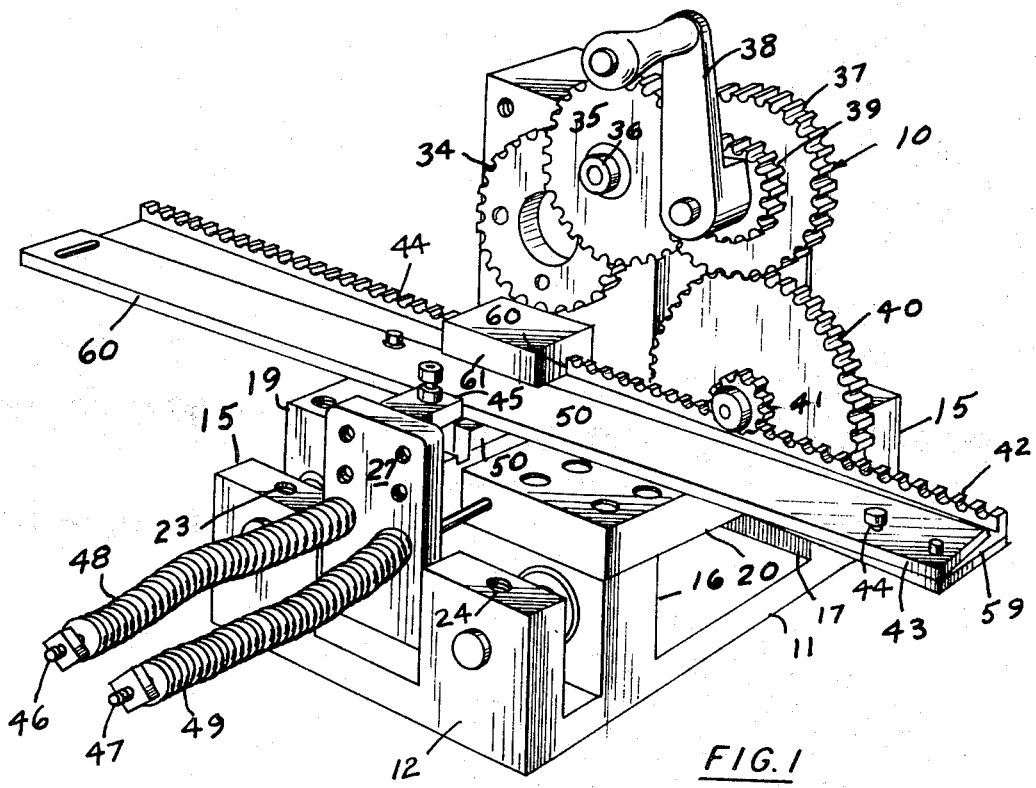
FIGS. 1 and 2 are isometric views of the machine according to the invention.
Figure 2:
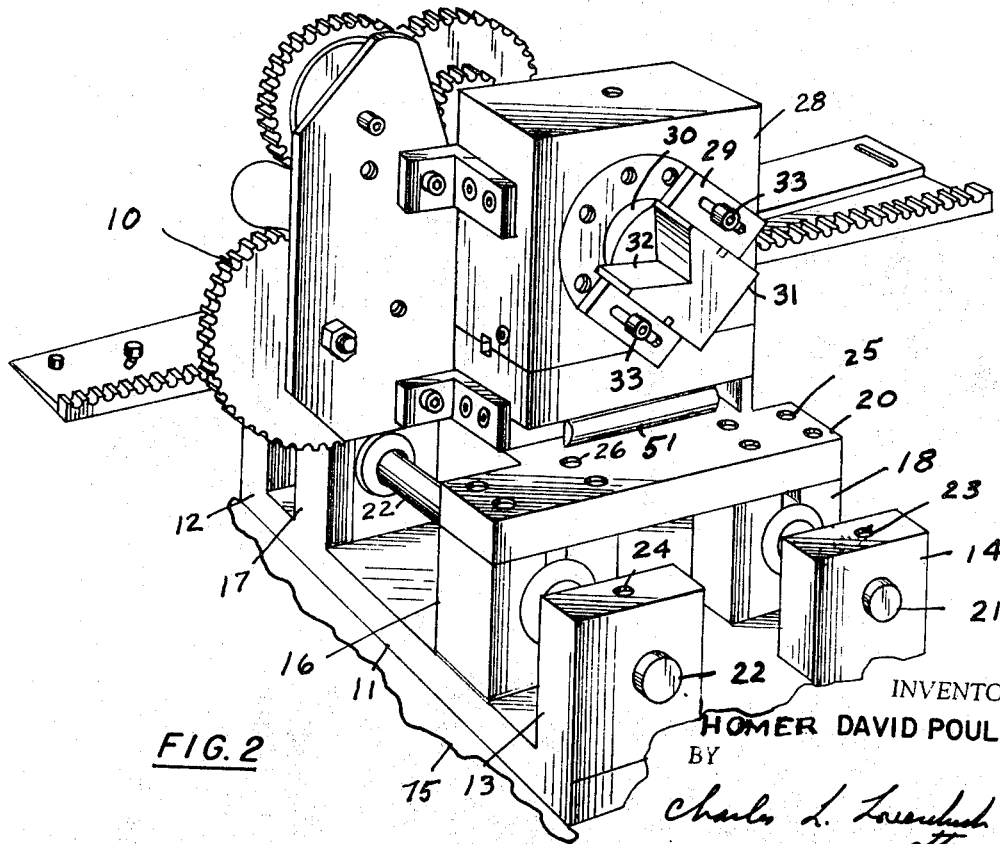

In the fixture disclosed, generally indicated at 10, a base 11 is provided, which may be in the form of a flat plate having a flat bottom that may be supported on a machine table, for example a table having a magnetic chuck. The base may be made of magnetic material which can be clamped by means of the magnetic chuck. The base has the upwardly extending brackets 12, 13, 14 and 15 thereon to which the ways 21 and 22 are clamped by means of screws 23 and 24 in a conventional manner. The support 20 is attached to the bearing members 16, 17, 18 and 19 by means of the screws in the holes 20 and this plate may slide backward and forward on the ways 21 and 22. A bracket 27 is fixed to the base and extends upwardly therefrom and has spaced holes therein that receive the rods 46 and 47. Rods 46 and 47 are fixed to the support plate 20 and springs 48 and 49 engage the outer side of the bracket 27 and are held in restraint by means of the nuts on rods 46 and 47. Thus, the springs urge the support 20 toward the follower 45. The follower 45 is fixed to the bracket 27.

The headstock 28 is swingably supported on the support 20 by means of a pivot 54 and a sine bar 51 is supported under the front edge of the headstock 28. The link 52 is swingably attached to the support plate 20 at 53 and may be clamped to the headstock by means of a pin 57. Thus, angularity of the axis of rotation of the spindle shaft 30 may be adjusted by means of the sine bar.

The chuck jaw 31 has a V-notch 32 in it which may receive a suitable rod to be threaded and the V-notch is attached to the spindle 30 by means of set screws 33. The drive gear 34 is fixed to the spindle 30 and it engages an idler 35 supported on an axle 36. An input gear 37 has a crank 38 fixed to it and input gear 37 when rotated will drive the idler 35 and the drive gear 36 as well as the transfer gear 40 and transfer sprocket 41. The sprocket 39 engages the idler 35. Thus, when the crank is rotated, the rack 42 will be moved transversely of the axis of rotation of the spindle 30 and the cam surface 60 will engage the follower 45 and urge the support plate 20 and headstock as well as the spindle in a direction away from the follower and in a direction to compress the springs 48 and 49.

The rack 42 extends upwardly from the plate 59 and is received in a groove 60 in the guide member 61. The angle bar 43 is attached to the plate 59 by means of the set screws 44, which are received in slots as shown, so that when the set screws 44 are moved to a loosened position, the angle bar 43 may be swung relative to the plate 59 and, thus, the angularity of the cam surface 60 to the axis of the rotation of the spindle can be adjusted so that the headstock is moved more rapidly for each revolution of the spindle.

Thus, it will be seen that when a rod to have a thread ground thereon is clamped in the chuck 29 and brought into engagement with the grinding wheel 76 on the table of a machine indicated generally at 75, as the crank 38 is rotated, the spindle will be rotated and advanced along its axis of rotation during each rotation in amount in proportion to the angular rotation of the surface 60 to the axis of rotation of the spindle. The angle of the axis of rotation of spindle 30 to the direction of sliding of the headstock on the ways 21 and 22 can be adjusted in a vertical plane by means of the sine bar.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A fixture adapted to be supported on the work table of a thread grinding machine or the like for holding an article on which a spiral is to be ground comprising,
   a base having a relatively flat bottom surface adapted to rest on said table,
   said base having bracket members extending upwardly therefrom,
   way members supported on said bracket members,
   a support,
   bearing members on said support extending downwardly therefrom,
   means on said bearing members slidably engaging said way member,
   a headstock, means supporting said headstock on said base,
a rack slidably supported on said base to slide in a path transverse of said ways,
a cam surface on said rack,
a follower on said support engaging said cam,
gear means on said spindle for rotating said spindle,
said gear means engaging said rack to move said rack transversely of said ways,
spring means on said fixture urging said spindle and said headstock toward said follower,
said cam member being attached to said rack by means of slots in said cam member and screws extending through said slots and into said rack whereby the angle of said cam surface to said ways may be adjusted.

2. The fixture recited in claim 1 wherein said headstock is supported on said base by means of a pivot and sine bar whereby the angle of the axis of rotation of said spindle relative to said ways may be adjusted.

References Cited

UNITED STATES PATENTS

| | | | |
|---|---|---|---|
| 407,577 | 7/1889 | Cox | 51—95 |
| 2,456,407 | 12/1948 | Green | 51—95 X |
| 2,471,539 | 5/1959 | Parker | 51—232 |
| 2,795,091 | 6/1957 | Ubdenstock | 51—232 X |

FOREIGN PATENTS 610,369  10/1948  Great Britain.

HAROLD D. WHITEHEAD, Primary Examiner

U.S. Cl. X.R.

51—95